United States Patent [19]
Kersey et al.

[11] Patent Number: 5,748,312
[45] Date of Patent: May 5, 1998

[54] SENSING APPARATUS AND METHOD FOR DETECTING STRAIN BETWEEN FIBER BRAGG GRATING SENSORS INSCRIBED INTO AN OPTICAL FIBER

[75] Inventors: Alan D. Kersey, Fairfax Station; Michael A. Davis, Arlington, both of Va.

[73] Assignee: United States of American as represented by the Secretary of the Navy, Washington, D.C.

[21] Appl. No.: 530,044

[22] Filed: Sep. 19, 1995

[51] Int. Cl.$^6$ ............................................. G01B 9/02
[52] U.S. Cl. ........................ 356/345; 356/35.5; 356/352; 250/227.23
[58] Field of Search ........................ 356/345, 352, 356/32, 33, 35.5; 250/227.13, 227.18, 227.23; 73/800

[56] References Cited

U.S. PATENT DOCUMENTS

| | | |
|---|---|---|
| 4,581,527 | 4/1986 | Crane et al. . |
| 4,725,124 | 2/1988 | Taylor . |
| 4,772,092 | 9/1988 | Hofer et al. . |
| 4,806,012 | 2/1989 | Meltz et al. . |
| 5,096,277 | 3/1992 | Kleinerman . |
| 5,319,435 | 6/1994 | Melle et al. . |
| 5,351,321 | 9/1994 | Snitzer et al. . |
| 5,363,463 | 11/1994 | Kleinerman . |
| 5,380,995 | 1/1995 | Udd et al. ............... 356/345 |
| 5,381,493 | 1/1995 | Egalon et al. . |
| 5,394,488 | 2/1995 | Fernald et al. . |
| 5,400,422 | 3/1995 | Askins et al. . |
| 5,401,956 | 3/1995 | Dunphy et al. ............... 250/227.23 |
| 5,493,113 | 2/1996 | Dunphy et al. ............... 250/227.23 |

OTHER PUBLICATIONS

M.A. Davis, A.D. Kersey, T.A. Berkoff, and D.G. Bellemore, Subcarrier Based Path–Integrating Strain Array Utilizing Fiber Bragg Gratings, SPIE vol. 2294 (1994).

*Primary Examiner*—Samuel A. Turner
*Attorney, Agent, or Firm*—Thomas E. McDonnell; Edward F. Miles

[57] ABSTRACT

A sensing apparatus and related method for sensing strain between fiber Bragg grating sensors inscribed in an optical fiber. The fiber is inscribed with a first fiber Bragg grating sensor and a second fiber Bragg grating sensor. A strain detection unit detects strain between the first fiber Bragg grating sensor and the second fiber Bragg grating sensor based on the optical propagation time of light projected into the fiber and reflected by the first fiber Bragg grating sensor and the optical propagation time of light projected into the fiber and reflected by the second fiber Bragg grating sensor. More specifically, light projected into the fiber is modulated with an RF signal. A phase change of the RF signal is determined from the light projected into the fiber and reflected by the first fiber Bragg grating sensor and from the light projected into the fiber and reflected by the second fiber Bragg grating sensor. The phase change of the RF signal is related to the optical propagation time of light projected into the fiber and reflected by the first and second fiber Bragg grating sensors. The strain between the first and second fiber Bragg grating sensors is then determined from the detected phase changes.

12 Claims, 6 Drawing Sheets

SENSING APPARATUS AND METHOD FOR DETECTING STRAIN BETWEEN FIBER BRAGG GRATING SENSORS INSCRIBED INTO AN OPTICAL FIBER

BACKGROUND OF THE INVENTION

1. Field of the Invention

The present invention relates to a sensing apparatus and method for detecting strain on an optical fiber and, more particularly, to a sensing apparatus and method for detecting strain between fiber Bragg grating sensors inscribed into an optical fiber.

2. Description of the Related Art

Fiber Bragg grating (FBG) sensors (hereinafter interchangeably referred to as either FBG sensors or fiber Bragg grating sensors) have attracted considerable interest in sensing strain on a fiber, due to the intrinsic nature and wavelength-encoded operation of FBG sensors. Each FBG sensor has a characteristic Bragg wavelength (and corresponding characteristic Bragg frequency) and only reflects light having a wavelength approximately equal to that wavelength. In prior devices, strain on a FBG sensor produces a wavelength shift in the light reflected by the FBG sensor by stretching the grating, and hence lengthening the spacing between grating In such devices, a plurality of FBG sensors, each having a different Bragg wavelength, can be inscribed into a length of optical fiber and selectively addressed using either wavelength-division, or time-division, multiplexing to determine the strain at each respective FBG sensor. For example, a fiber having FBG sensors inscribed therein can be embedded into advanced composite materials to allow real time evaluation of load, strain, temperature, vibration and other such factors affecting the composite material. A composite material embedded with FBG sensors is typically referred to as a "smart structure".

In such fiber optic sensor systems, strain is determined only at each point in the fiber where an FBG sensor is inscribed. This point-by-point detection of strain is referred to as "quasi-point" sensing. Unfortunately, a conventional fiber optic sensor system utilizing FBG sensors cannot detect the strain between individual FBG sensors.

Figure 1A:
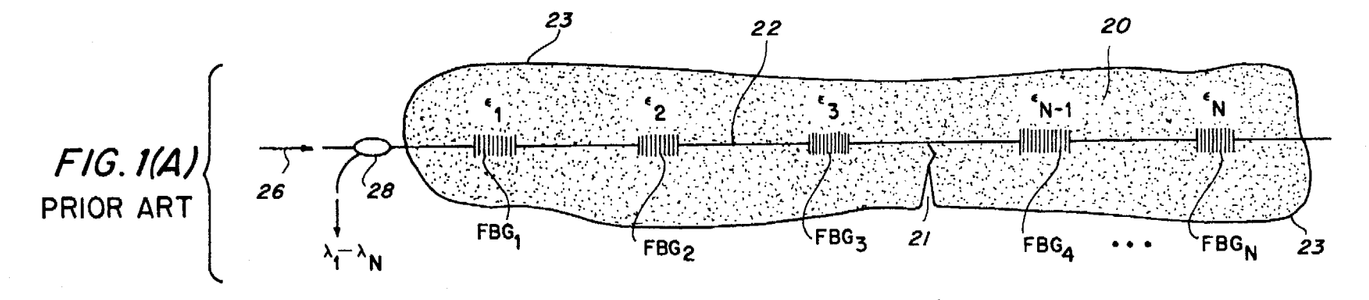
FIG. 1(A) (prior art) is a diagram illustrating a fiber inscribed in a structure for detecting strain on the structure.

FIGS. 1(A) through (C) illustrate this. FIG. 1(A) is a schematic illustrating a fiber embedded in structure 20 for detecting strain on the structure. Fiber 22 is inscribed with a plurality of FBG sensors, $FBG_1, \ldots, FBG_N$, where N equals the number of FBG sensors. Member 20 is subject to stress, which, because fiber 22 is embedded in member 20, produces a corresponding stress continuously along fiber 22, including stresses $\epsilon_1, \ldots, \epsilon_N$ at respective gratings $FBG_1, \ldots, FBG_N$. As illustrated in FIG. 1(A), structure 20, such as a concrete beam, has a crack 21. A light source (not illustrated) transmits a light beam 26 into fiber 22. Each of FBG sensor of $FBG_1, \ldots, FBG_N$ has a respectively corresponding Bragg wavelength, $\lambda_1, \ldots, \lambda_N$, and reflects light at approximately the corresponding Bragg wavelength. Therefore, for example, $FBG_1$ only reflects light having approximately the corresponding Bragg wavelength $\lambda_1$ of $FBG_1$. Similarly, $FBG_2$ only reflects light having approximately the corresponding Bragg wavelength $\lambda_2$ of $FBG_2$. A coupler 28 receives light reflected from $FBG_1, \ldots, FBG_N$. The wavelength of the reflected light received by coupler 28 is analyzed to determine the strain on each respective FBG sensor of $FBG_1, \ldots, FBG_N$. For example, if the reflected light received by coupler 28 is filtered to isolate light having a wavelength corresponding to a band surrounding Bragg wavelength $\lambda_1$ of $FBG_1$, presence of an optical signal indicating a reflection from $FBG_1$. By analyzing how far the center wavelength of the light reflected by $FBG_1$ has shifted from nominal center, one can determine by how much the grating has stretched, and thus what the stress $\epsilon_1$, is at $FBG_1$ which produced the stretching. In the same manner, the strains, $\epsilon_2, \ldots, \epsilon_N$, respectively corresponding to FBG sensors $FBG_2 \ldots FBG_n$, can also be determined.

Figure 1B:
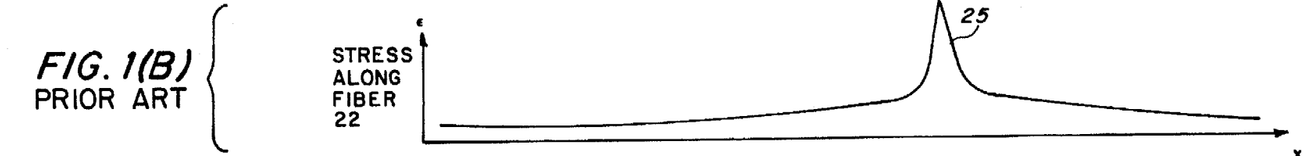
FIG. 1(B) (prior art) is a graph illustrating the strain on the structure illustrated FIG. 1(A).

FIG. 1(B) is a graph illustrating the strain on structure 20 in relation to distance along structure 20. As illustrated by FIG. 1(B), structure 20 experiences stress spike 25 at the formation of crack 21. Because stress is so high at crack 25, structure 20 will more likely fail there than elsewhere, a fact which one would like to know beforehand. Unfortunately, because stress is measured at the gratings, rather than between them, this may not be the case.

Figure 1C:
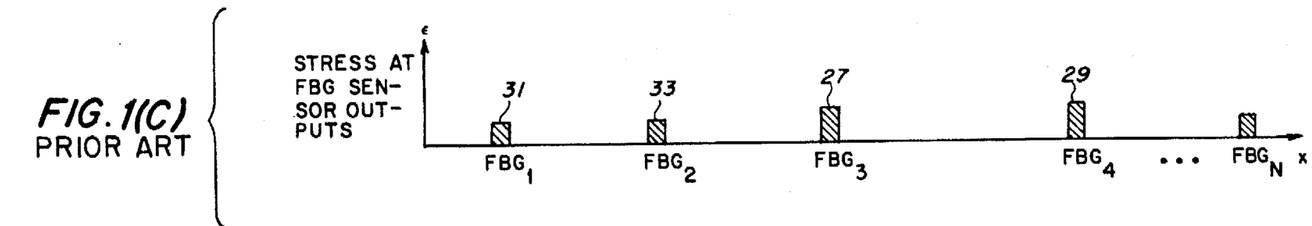
FIG. 1(C) (prior art) is a graph illustrating the measured strain on FBG sensors inscribed in the structure illustrated in FIG. 1(A).

FIG. 1(C) illustrates this by a graph showing measured strain at each of $FBG_1, \ldots, FBG_N$. The measured strain on $FBG_1, \ldots, FBG_N$. The tail of stress spike 25 causes the stresses 27, 29 across $FBG_3$ and $FBG_4$ to increase somewhat compared to stresses 32, 33 across $FBG_1$ and $FBG_2$, but not dramatically so, certainly no by an amount to alert on to stress spike 25.

Therefore, as illustrated by FIGS. 1(A), 1(B), and 1(C), a conventional fiber optic sensor system only detects the strain at individual points in a structure where an FBG sensor is inscribed, and cannot detect the strain between the individual points. Thus, a conventional fiber optic sensor system would not detect crack 21 in structure 20.

SUMMARY OF THE INVENTION

Accordingly, it is an object of the present invention to provide a sensing apparatus and method which detects strain between individual FBG sensors of an FBG sensor array inscribed in a fiber.

It is a further object of the present invention to provide a sensing apparatus and method which use the optical propagation times corresponding to individual FBG sensors of an FBG sensor array inscribed in a fiber, to determine the integrated strain over a fiber length between respective FBG sensors.

It is also an object of the present invention to provide a sensing apparatus and method which uses wavelength division-based addressing to selectively address individual FBG sensors of an FBG sensor array inscribed in a fiber, and an RF subcarrier to determine the optical propagation time between respective FBG sensors of the FBG sensor array.

Objects of the present invention are achieved by a sensing apparatus which includes a fiber inscribed with a first fiber Bragg grating sensor and a second fiber Bragg grating sensor, and a strain detection unit detecting the strain between the first fiber Bragg grating sensor and the second fiber Bragg grating sensor.

Objects of the present invention are also achieved by providing a sensing apparatus having a strain detection unit and a fiber inscribed with fiber Bragg grating sensors, wherein the fiber is inscribed with a first fiber Bragg grating sensor having a corresponding Bragg wavelength and which reflects light at approximately the corresponding Bragg wavelength, and a second fiber Bragg grating sensor having a corresponding Bragg wavelength and which reflects light at approximately the corresponding Bragg wavelength. The strain detection unit projects light into the fiber, and includes a modulator which modulates the light projected into the fiber with an RF signal.

Strain on the fiber causes an elongation or contraction of the fiber. This elongation or contraction of the fiber causes a change in the round-trip propagation time of light projected into the fiber and reflected by the first or second fiber Bragg grating sensor, thereby causing a phase change in the phase of the RF signal modulated on the light projected into the fiber. Therefore, the strain detection unit includes a phase detector which detects the phase change of the RF signal. This phase change is related to the change in the optical propagation time.

More specifically, the phase detector receives the RF signal as a reference signal. The phase detector (a) detects, with respect to the reference signal, the phase of the RF signal modulated on the light projected into the fiber and reflected by the first fiber Bragg grating sensor, and (b) detects, with respect to the reference signal, the phase of the RF signal modulated on the light projected into the fiber and reflected by the second fiber Bragg grating sensor. The strain detection unit also includes a strain computation unit which computes the strain between the first fiber Bragg grating sensor and the second fiber Bragg grating sensor from the detected phase of the RF signal modulated on the light projected into the fiber and reflected by the first fiber Bragg grating sensor and the detected phase of the RF signal modulated on the light projected into the fiber and reflected by the second fiber Bragg grating sensor.

Objects of the present invention are further achieved by providing a method for sensing strain on a fiber. The method includes the steps of (a) providing a fiber inscribed with a first fiber Bragg grating sensor and a second fiber Bragg grating sensor, (b) projecting light into the fiber at approximately the Bragg wavelength corresponding to the first fiber Bragg grating sensor so that the light at approximately the Bragg wavelength of the first fiber Bragg grating sensor is reflected by the first fiber Bragg grating sensor, (c) projecting light into the fiber at approximately the Bragg wavelength corresponding to the second fiber Bragg grating sensor so that the light at approximately the Bragg wavelength of the second fiber Bragg grating sensor is reflected by the second fiber Bragg grating sensor, (d) modulating the light projected into the fiber with an RF signal, (e) detecting, with respect to the RF signal as a reference signal, the phase of the RF signal modulated on the light projected into the fiber and reflected by the first fiber Bragg grating sensor, (f) detecting, with respect to the RF signal as a reference signal, the phase of the RF signal modulated on the light projected into the fiber and reflected by the second fiber Bragg grating sensor, and (g) computing the strain between the first fiber Bragg grating sensor and the second fiber Bragg grating sensor from the detected phase of the RF signal modulated on the light projected into the fiber and reflected by the first fiber Bragg grating sensor and the detected phase of the RF signal modulated on the light projected into the fiber and reflected by the second fiber Bragg grating sensor.

Additional objects and advantages of the invention will be set forth in part in the description which follows and, in part, will be apparent from the description or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 2A:
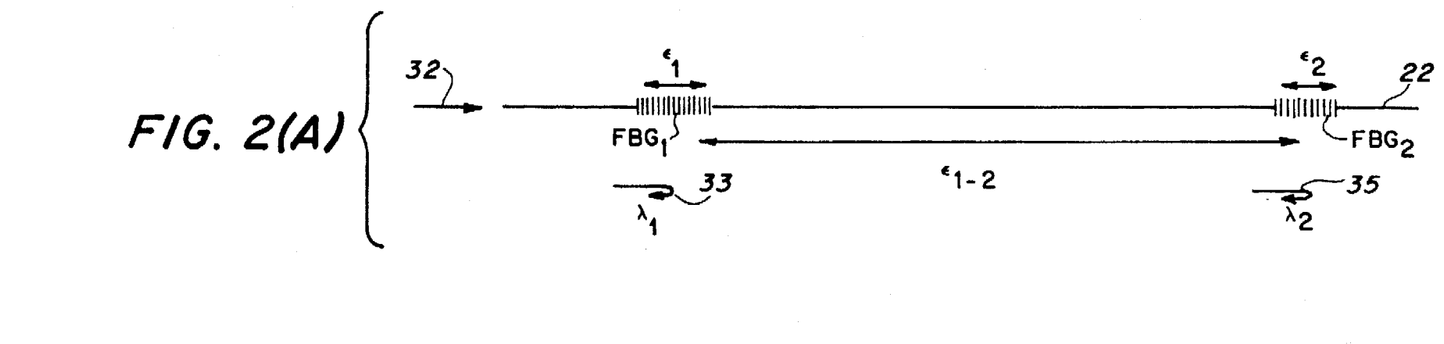
FIG. 2(A) is a diagram illustrating the strain between two individual FBG sensors inscribed in a fiber, according to an embodiment of the present invention.
Figure 2B:
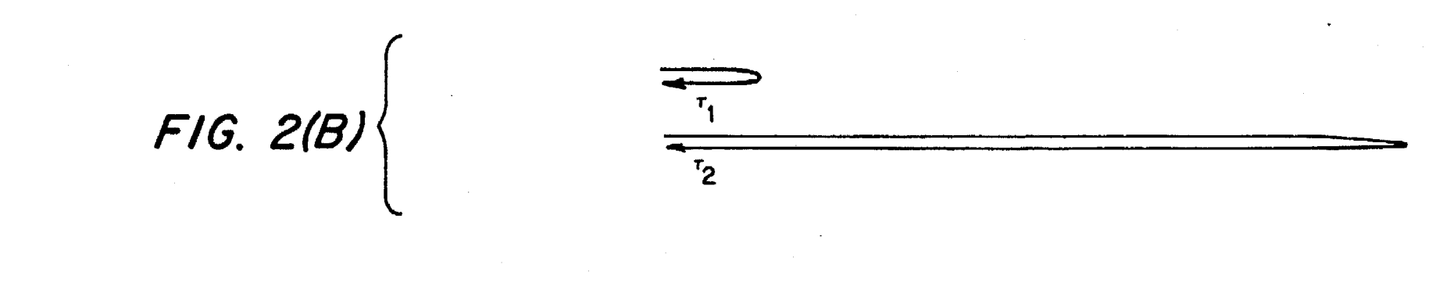
FIG. 2(B) is a diagram illustrating the phase of light reflected by individual fiber Bragg grating sensors inscribed in a fiber, according to an embodiment of the present invention.

FIG. 2(A) is a diagram illustrating the strain between two individual FBG sensors inscribed in a fiber, and FIG. 2(B) is a diagram illustrating the phase of light reflected by the FBG sensors illustrated in FIG. 2(A), according to an embodiment of the present invention. As illustrated in FIG. 2(A), a tunable light source (not illustrated) transmits light 32 into fiber 22 at approximately the Bragg wavelength $\lambda_1$ of $FBG_1$, and then transmits light 32 at approximately the Bragg wavelength $\lambda_2$ of $FBG_2$. $FBG_1$ reflects light 33 which is at approximately the Bragg wavelength $\lambda_1$, and $FBG_2$ reflects light 35 which is at approximately the Bragg wavelength $\lambda_2$. Light 33 is analyzed to determine the round trip travel time $\tau_1$ of light 33, and light 35 is analyzed to determine the round trip travel time $\tau_2$ of light 35. The times $\tau_1$ and $\tau_2$ indicate the optical propagation time between $FBG_1$ and $FBG_2$. This optical propagation time changes as strain on fiber 22 causes an elongation or contraction of the length of fiber 22. Therefore, according to embodiments of the present invention, the differential strain $\epsilon_{1-2}$ between $FBG_1$ and $FBG_2$ is determined from the measured phases $\tau_1$ and $\tau_2$.

Figure 3A:
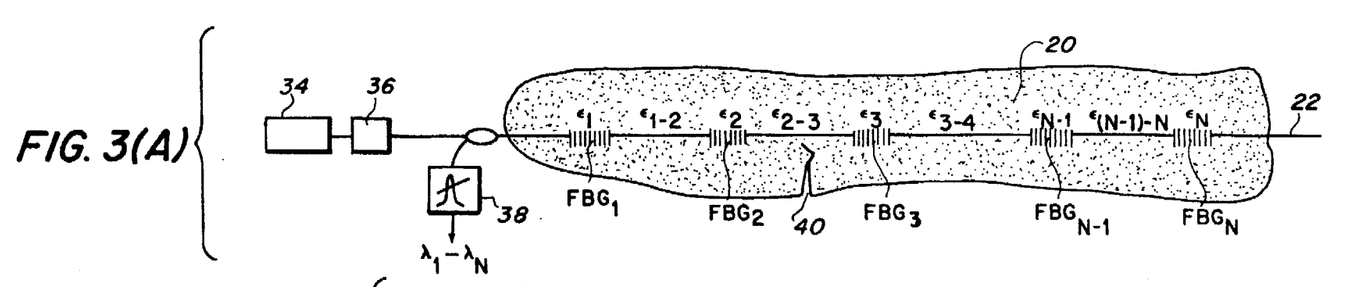
FIG. 3(A) is a diagram illustrating a sensing system for sensing strain on a fiber inscribed in a structure, according to an embodiment of the present invention.

FIG. 3(A) is a diagram illustrating a sensing system for sensing strain on a fiber inscribed in a structure, according to an embodiment of the present invention. As illustrated in FIG. 3(A), fiber 22 has FBG sensors $FBG_1, \ldots, FBG_N$ inscribed therein. A conventional broadband source 34 produces broadband light which is modulated with an RF signal by a conventional RF modulator 36, and then transmitted into fiber 22. Since the light transmitted into fiber 22 by broadband source 34 is modulated with an RF signal (not shown), the light transmitted into fiber 22 can be referred to as a "carrier" signal and the RF signal modulated thereon can be referred to as an RF "subcarrier" signal. The RF subcarrier modulated light transmitted into fiber 22 is reflected by each respective FBG sensor of $FBG_1, \ldots, FBG_N$ at the corresponding Bragg wavelength. A conventional tunable filter 38 is selectively and sequentially tuned to approximately the Bragg wavelength of each FBG sensor of $FBG_1, \ldots, FBG_N$, to determine the reflected signal from each FBG sensor. More specifically, according to embodiments of the present invention, the output of tunable filter 38 is analyzed to determine the phase change of the RF subcarrier modulated on the light projected into fiber 22 and reflected from each FBG sensor of $FBG_1, \ldots, FBG_N$. The strain between respective FBG sensors of $FBG_1, \ldots, FBG_N$ is determined from the detected phase change.

Figure 3B:
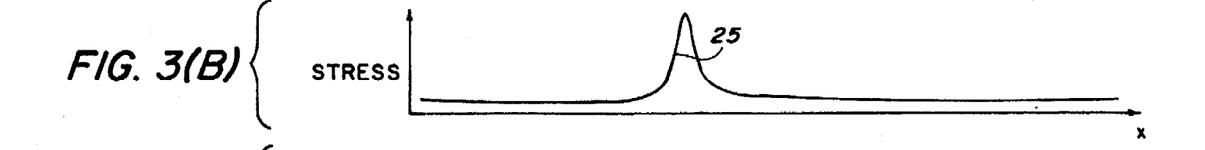
FIG. 3(B) is a graph illustrating the strain on the structure illustrated FIG. 3(A).

As illustrated in FIG. 3(A), structure 20 has a crack 40 therein. Crack 40 produces stress spike 25 on structure 20. FIG. 3(B) is a diagram illustrating the stress resulting from crack 40 in structure 20, wherein the x axis in FIG. 3(B) represents the length of structure 20. As illustrated by FIGS. 3(A) and 3(B), crack 40 is between $FBG_2$ and $FBG_3$, and the stress corresponding to crack 40 is between $FBG_2$ and $FBG_3$.

Figure 3C:
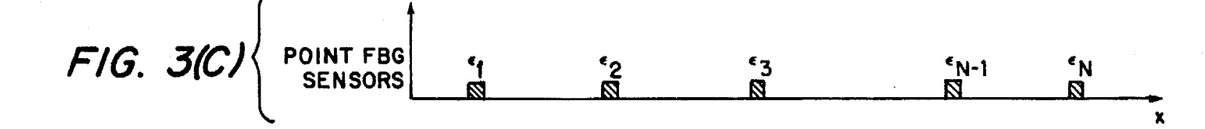
FIG. 3(C) is a graph illustrating the strain on the structure illustrated FIG. 3(A), as detected by a conventional sensing system.

FIG. 3(C) is a graph like that of FIG. 1(c) illustrating the strain on structure 20, as detected by a conventional sensing system which determines strain on a point-by-point basis at each individual FBG sensor. The strain detected by a conventional sensing system is essentially a point sampling, along the x axis, of the stress illustrated in FIG. 3(B). For example, the strain 31 detected by $FBG_1$ represents a point sample of the stress illustrated in FIG. 3(B) at the point in structure 20 where $FBG_1$ is inscribed. Therefore, as previously described, a conventional sensing system does not detect strain between individual FBG sensors. As a result, as illustrated by FIG. 3(C), the stress from crack 40 is not detected by a conventional sensing system since the stress from crack 40 is between FBG sensors.

Figure 3D:
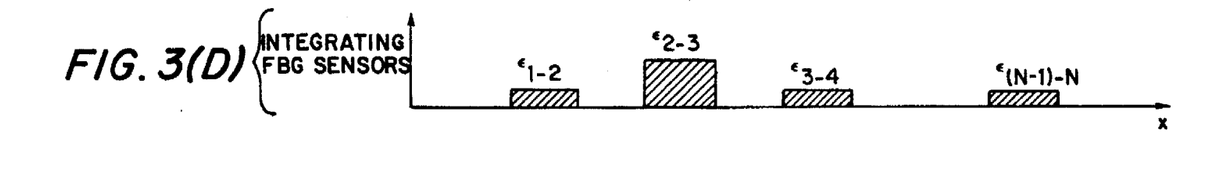
FIG. 3(D) is a graph illustrating the strain on the structure illustrated FIG. 3 (A), as detected by a sensing system according to the invention.

FIG. 3(D) is a graph illustrating the integrated strain between consecutive Bragg gratings in structure 20, as detected by a sensing system according to an embodiment of the present invention. As illustrated by FIG. 3(D), the strain $\epsilon_{2-3}$ between individual FBG sensors of $FBG_1, \ldots, FBG_N$ is detected. For example, FIG. 3(D) illustrates the strain detected between $FBG_1$ and $FBG_2$ as $\epsilon_{1-2}$ and the strain detected between $FBG_2$ and $FBG_3$ as $\epsilon_{2-3}$. As illustrated by FIG. 3(D), the strain between $FBG_2$ and $FBG_3$ is much higher than the strain between other FBG sensors, thereby indicating very highly stressed areas between, but away from, Bragg gratings $FBG_2$ and $FBG_3$, despite the relatively low strain measurements $\epsilon_1, \epsilon_2, \epsilon_3, \ldots, \epsilon_N$ made at gratings $FBG_1, \ldots, FBG_N$.

Figure 4:
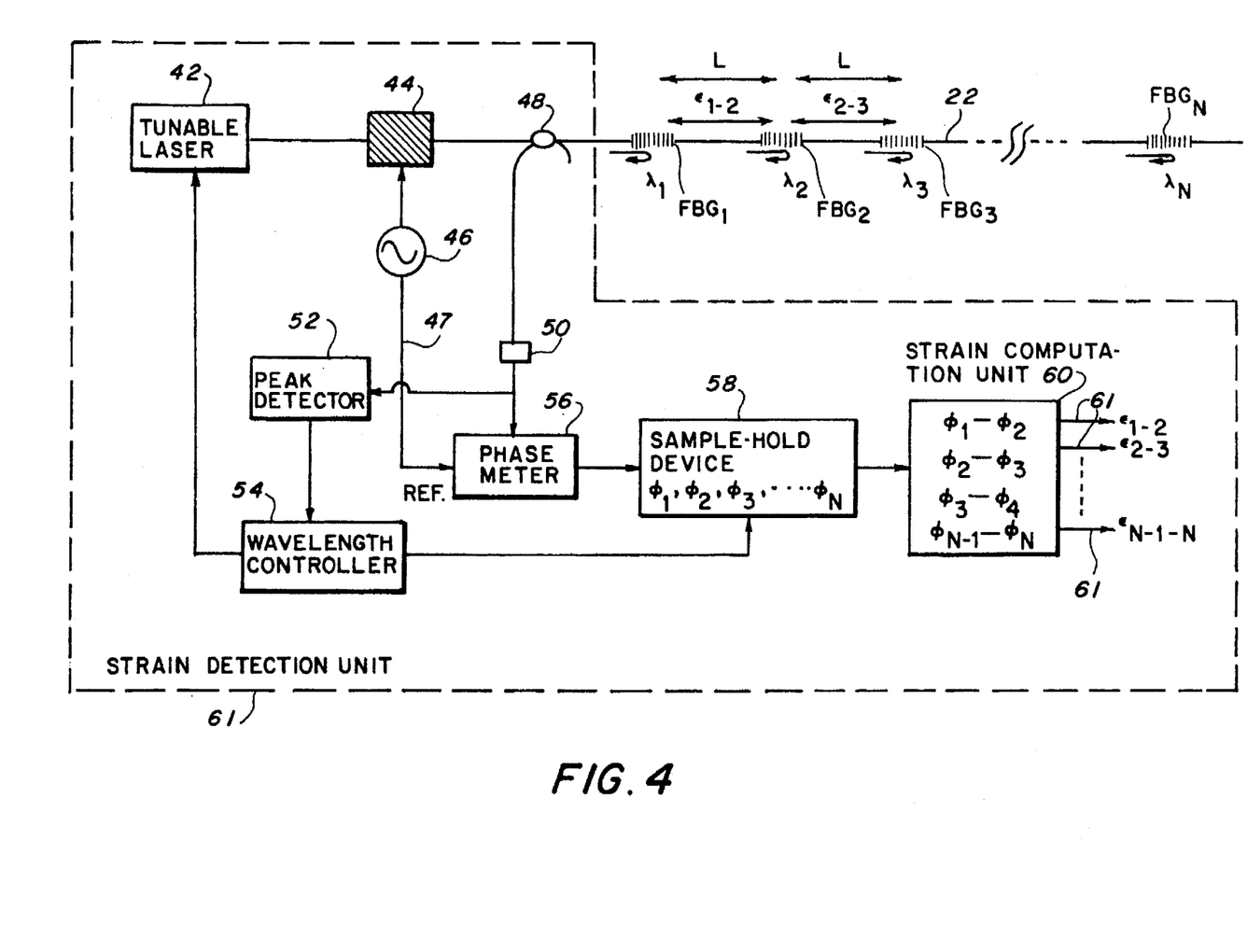
FIG. 4 is a diagram illustrating a sensing system, according to an embodiment of the present invention.

FIG. 4 is a diagram illustrating a sensing system, according to an embodiment of the present invention. A conventional tunable laser 42 projects light into fiber 22 and is selectively tunable to the respective Bragg wavelengths corresponding to each FBG sensor of $FBG_1, \ldots, FBG_N$. The light projected by tunable laser 42 is intensity modulated by a conventional intensity modulator 44 with an RF signal (hereinafter referred to as an "RF subcarrier signal") having a frequency of $f_{mod}$ and produced by a conventional RF drive 46. The RF subcarrier modulated light is transmitted into fiber 22 and then reflected by a respective FBG sensor of $FBG_1, \ldots, FBG_N$ having a Bragg wavelength corresponding to the wavelength of the light projected by tunable laser 42.

The RF subcarrier signal is modulated onto the light projected into fiber 22. Strain on fiber 22 between two respective FBG sensors causes fiber 22 to be contracted or elongated, thereby effecting the relative optical propagation times of light transmitted into fiber 22 and reflected by the two respective FBG sensors. Thus, for at least one of the FBG sensors, the round-trip propagation time changes for light transmitted into fiber 22 and reflected by the FBG sensor. This change in the round-trip propagation time causes a shift in the phase between the reflected RF signal and RF drive 46, the latter acting as system reference.

Referring again to FIG. 4, light reflected by each FBG sensor of $FBG_1, \ldots, FBG_N$ is received by a conventional coupler 48 and directed to a conventional detector 50 which converts the reflected light signals into electrical signals. Detector 50 outputs an electric signal proportional to the intensity of the optical input from coupler 48. Optical intensity is proportional to the square of an optical signal's electric field. Thus for a continuous wave input, the output of detector 50 responsive to reflection from a given Bragg grating will be in the form of a sinusoid at the grating's characteristic frequency, intensity modulated by a signal envelope in the form of a sinusoid squared of the frequency of the RF subcarrier. Phase meter 56 receives the outputs of detector 50, and RF reference 46 via line 47, compares the relative phases of the subcarrier envelope and reference 46 in a conventional manner to determine the amount $\phi$ by which the phases differ, and records $\phi$ in conventional memory 58. After preferably addressing each grating 1 through N in this manner, memory 58 will have recorded a corresponding phase $\phi_1, \ldots, \phi_N$ for each grating. Computation unit 60, e.g. a conventional digital processor, calculates and stores the phase difference of reflections between each consecutive pair of Bragg gratings, i.e. $\phi_1-\phi_2, \phi_2-\phi_3, \ldots, \phi_{N-1}-\phi_N$. As discussed above, each of these phase differences is proportional to stress induced elongation of fiber 22, from which one can calculate the total, or integrated, stress between the respective gratings. Additionally, computation unit 60 preferably, reports corresponding inter-grating stresses $\epsilon_{1-2}, \ldots, \epsilon_{(N-1)-N}$ via outputs 61.

The electrical signals produced by detector 50 are received in parallel by a phase meter 56 and a conventional peak detector 52 which detects the optical frequency of reflected light. The frequency response of a typical Bragg grating having a characteristic optical frequency is that of any resonant system, i.e. has peak reflection at the characteristic, or resonant, optical frequency, and continual, generally sharp, decreasing reflectance with increasing distance from the characteristic optical frequency. Peak detector 52 determines the optical frequency which is reflected most strongly from the Bragg grating being addressed, and forwards this information to controller 54 for determining spectral intensity. Peak detector 42 could be a simple spectrum analyzer, or any other conventional means. For example, one could design controller 54 to cause laser 42 to produce a constant intensity, frequency chirped, optical signal, and then proceed as before to determine which optical frequency of the chirped signal reflects most strongly.

The wavelength corresponding to the peak detected by peak detector 52 can preferably be used by wavelength controller 54 to selectively tune tunable laser 42 to a frequency corresponding to a Bragg wavelength of a different FBG sensor of $FBG_1, \ldots, FBG_N$. For example, $FBG_1, \ldots, FBG_N$ can be sequentially arranged in fiber 22 so that the corresponding Bragg wavelength of each respective FBG sensor increases as the respective FBG sensor is further positioned down fiber 22. Therefore, $FBG_1$ would have the lowest Bragg wavelength and $FBG_N$ would have the highest Bragg wavelength. Then, wavelength controller 54 can receive the wavelength of a reflected signal and can incrementally tune tunable laser 42 in "steps" to efficiently control tunable laser 42 so that each FBG sensor of $FBG_1, \ldots, FBG_N$ is individually addressed. Thus, peak detector 52 and wavelength controller 54 together function as a laser controller to detect the wavelength of light reflected by $FBG_1, \ldots, FBG_N$ and to use the detected wavelength to selectively tune tunable laser 42.

The respective phases measured by phase meter 56 are stored in a conventional sample-hold device 58. Sample-hold device 58 is a conventional memory device which simply holds the phase values measured by phase meter 56. Wavelength controller 54 is connected to sample-hold device 58 so that each respective phase stored in sample-hold device 58 can be accessed by referring to the wavelength of the corresponding signal. Therefore, sample-hold device 58 stores phases $\Phi_1, \ldots, \Phi_N$ measured by phase meter 56 with respect to the RF reference 46, and which correspond, respectively, to the phases of the RF subcarrier signal modulated on light reflected by $FBG_1, \ldots, FBG_N$. The elongation of fiber 22 between any two of the Bragg gratings is proportional to the strain between the gratings, as is the increased propagation time of an optical signal between the gratings. Thus knowledge of phases $\phi_1, \ldots, \phi_N$, and the mechanical properties of the material which constitutes fiber 22, permits one to readily calculate the total stress between any two of the gratings. Accordingly, strain computation unit 60 computes the differential, or inter-grating, phases, $\phi_{(n-1),n}$, n=2, ..., N, and from this calculates the corresponding inter-grating stresses $\epsilon_{n-1,n}$. Therefore, as illustrated by FIG. 4, each FBG sensor of $FBG_1, \ldots, FBG_N$ is inscribed into fiber 22 to have a different Bragg wavelength from the other FBG sensors. Thus, each FBG sensor of $FBG_1, \ldots, FBG_N$ can be selectively addressed via the wavelength of light transmitted into fiber 22 by a light source. The Bragg wavelengths of $FBG_1, \ldots, FBG_N$ are chosen so that the wavelengths of reflected signals will not overlap even under maximum strain conditions. As an example, for an optical wavelength of 1300 nm a wavelength separation of 5 nm is required to ensure that a peak strain of 5000 µstrain does not cause overlap of the grating spectra. Therefore, for a source with approximately a 100 nm tuning range, twenty (20) FBG sensors could be used. In operation, the light from tunable laser 42 is injected into fiber 22 and coupled to the series array of $FBG_1, \ldots, FBG_N$. Each FBG sensor of $FBG_1, \ldots, FBG_N$ is separated by baseline differences which may differ. In the present example, it is assumed for simplicity that the distance, L, between FBG sensors of $FBG_1, \ldots, FBG_N$ is approximately equal.

As previously described, the phase of the RF subcarrier signal of the reflected light (that is, the returned optical signal) from each FBG sensor of $FBG_1, \ldots, FBG_N$ is detected by phase meter 56 and compared by phase meter 56 with a reference component at $f_{mod}$. A detected phase change in the phase of the RF subcarrier signal indicates a change in the optical propagation time caused by a strain on fiber 22. Preferably, the modulation frequency and round-trip propagation delay between tunable laser 42 and the first FBG sensor, $FBG_1$, are set so that the reference signal and reflected light are nominally in-phase (that is, having a phase difference of 2 mπ with m being an integer). Also, the round-trip phase delay between the first FBG sensor, $FBG_1$, and subsequent FBG sensors of $FBG_2, \ldots, FBG_N$ is preferably set to be an integer value of 2π.

Therefore, the laser wavelength of tunable laser 42 is tuned to the wavelength $\lambda_1$ of $FBG_1$, and a signal-reference phase reading is recorded from phase meter 56. This phase difference reading serves as a reference phase measurement. The laser wavelength of tunable laser 42 is then tuned to the wavelength $\lambda_2$ of $FBG_2$ and a phase reading is again recorded. This process is repeated for each subsequent FBG sensor. The difference in phase readings for adjacent FBG sensors of $FBG_1, \ldots, FBG_N$ is calculated and stored. Strain applied to a fiber section between two FBG sensors of $FBG_1, \ldots, FBG_N$ modifies the optical propagation time in fiber 22, and thereby results in a change in the measured RF phase delay.

An RF signal is preferably used to modulate the light projected into fiber 22 since the relatively long wavelength of an RF signal allows for relatively easy measurement of the phase shift caused by strain on fiber 22. Of course, modulating the light projected into fiber 22 with an RF signal will inherently cause a wavelength shift in the combined signal due to the mixing of the RF signal with the light. This wavelength shift should be considered when selectively addressing a specific FBG sensor. However, the inherent wavelength shift will typically be negligible since the RF signal has a much longer wavelength than would any optical signal carrier. Moreover, the light transmitted into fiber 22 can be selected to be slightly higher or slightly lower than the Bragg wavelength of a respective FBG sensor so that a wavelength shift caused by the mixing of the RF signal with the light will cause the RF modulated light to be at approximately the Bragg wavelength of a respective FBG sensor.

The sensitivity of the sensing system depends on the fiber length, and the RF modulation frequency $f_{mod}$. The difference in phase between two FBG sensors is given by the following Equation 1:

$$\Delta\Phi = (4\pi n L f_{mod})/c$$

where n is the fiber index, c is the velocity of light, and L is the fiber length between the two FBG sensors. The change in fiber strain $\epsilon_{(N-1)-N}$ between FBG sensors $FBG_{N-1}$ and $FBG_N$ is given by the following Equation 2:

$$\Phi_{N-1} - \Phi_N = (4\pi n L f_{mod} \xi \epsilon_{(N-1)-N})/c$$

where $\xi$ is a strain-optical parameter which is dependent on the photoelastic coefficients of the fiber. For example, $\xi$ equals 0.78 for silica fibers.

As an example of the sensing system sensitivity, for a ten (10) meter fiber section between adjacent FBG sensors, a 1000 µstrain (0.1%) strain on the fiber produces approximately a 10° phase shift. A phase meter with a 0.01° resolution would thus provide a strain resolution of approximately one (1) µstrain. In the above Equation 1 and Equation 2, the effect of the wavelength dependence of the fiber index is ignored, thereby giving rise to a slight phase offset in the phase readings as tunable laser 42 is tuned to each FBG sensor, but this will have only a limited, second-order effect of the operation of the sensing system.

Figure 5:
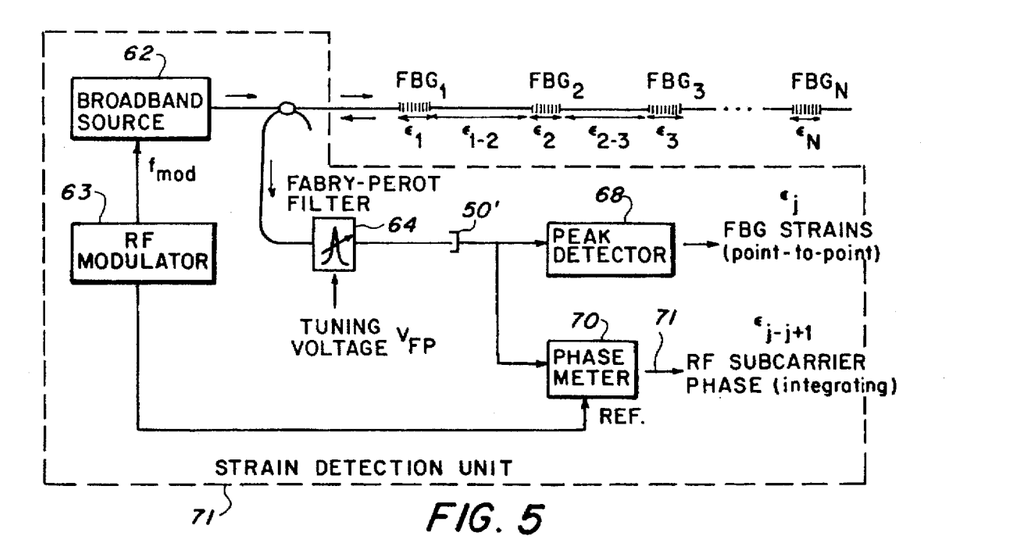
FIG. 5 is a diagram illustrating a sensing system, according to an additional embodiment of the present invention.

The sensing system illustrated in FIG. 4 utilizes a tunable laser as a light source. However, a broadband source can be used as the light source, instead of using a tunable laser. FIG. 5 is a diagram illustrating a sensing system using a broadband source, according to an embodiment of the present invention. A conventional broadband source 62 projects broadband light into fiber 22. A conventional RF modulator 63 modulates the broadband light projected by broadband source 62 with an RF subcarrier having a frequency of $f_{mod}$. Each FBG sensor of $FBG_1, \ldots, FBG_N$ reflects only light from broadband source 62 having a wavelength corresponding approximately to the Bragg wavelength of the respective FBG sensor. Therefore, a conventional filter 64, such as a Fabry-Perot filter, is selectively tuned by a tuning voltage, $V_{FP}$, to a wavelength corresponding to a respective FBG sensor. The filtered output of filter 64 is provided to an electro-optic detector 50', and to a conventional peak detector 68 which measures the peak of the reflected signal to determine the wavelength of light reflected from a respective FBG sensor in the manner above described. From an a priori knowledge of the unstressed center frequency of the Bragg gratings, one can use this wavelength to determine the strain at any of the respective FBG sensors, as in the conventional sensing systems described above. In addition, the filtered output of filter 64 is provided to a conventional phase meter 70, which also receives the RF subcarrier from RF modulator 63 as a reference signal. Output 71 of phase meter 70 can then be processed as would be the output of phase meter 56 in FIG. 4 to determine the integral stresses $\epsilon_{1-2}$, $\epsilon_{2-3}$, etc., between gratings.

Figure 6:
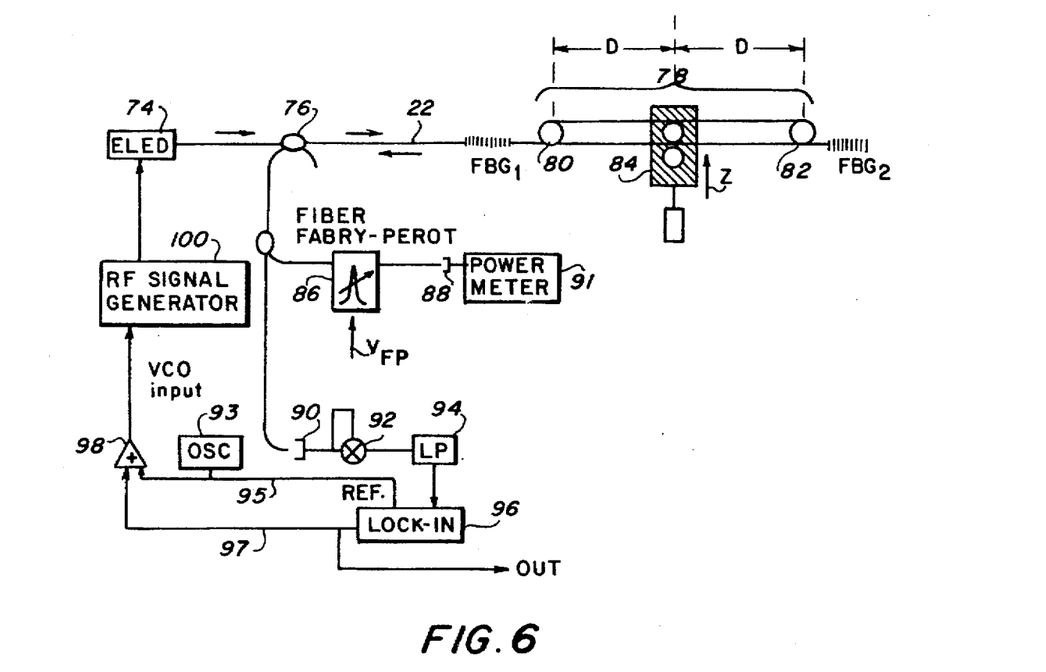
FIG. 6 is a diagram illustrating an experimental setup to test a sensing system using RF subcarrier modulation to modulate light projected from a light source, according to an embodiment of the present invention.

FIG. 6 is a diagram illustrating an experimental setup which was used to test a sensing system using RF subcarrier modulation to modulate light projected from a light source. As illustrated in FIG. 6, light from a conventional RF driven broadband ELED source 74 passed through a conventional input 3 dB coupler 76 and illuminated two fiber Bragg gratings, $FBG_1$ and $FBG_2$, inscribed in a fiber 22 and separated by twenty (20) meters of fiber. $FBG_1$ and $FBG_2$ reflected light at two independent wavelengths, $\lambda_1$ and $\lambda_2$, respectively. A fiber stretching device 78 for stretching the twenty meters of fiber between $FBG_1$ and $FBG_2$ was constructed as shown in FIG. 6, wherein twenty-six loops of fiber were wound around two one-inch diameter poles 80 and 82 separated by a distance 2D (78). A translation stage 84 of stretcher 78 stretched the fiber by inducing a lateral displacement z. Then, for z<<D, the integrated strain $\epsilon_{1-2}$ in the fiber between $FBG_1$ and $FBG_2$ was determined from the following Equation 3:

$$\epsilon_{1-2} = z^2/(2D^2)$$

The reflected wavelength components from $FBG_1$ and $FBG_2$ were directed through a tunable fiber Fabry-Perot (FFP) filter 86 and then to a first electro-optic detector 88. The reflected wavelength components from $FBG_1$ and $FBG_2$ were also directed to a second such detector 90. Filter 86 operated as a notch filter to selectably pass reflected light from any Bragg grating of interest responsive to adjustment of the voltage $V_{FP}$ applied to filter 86. Adjustment of $V_{FP}$ controllably varied the frequency notch which filter 86 passed, and power meter 91 was observed to determine the frequencies at which power was greatest. In this manner, the strain on $FBG_1$ and on $FBG_2$ was determined. This technique of adjusting $V_{FP}$ for addressing each FBG sensor demonstrated a resolution of approximately one (1) µstrain.

The reflected signal from the two gratings were coupled to optical detector 90 which produced an electrical output corresponding to the optical subcarrier signal. The electrical subcarrier signal was then fed to mixer 90, which was used to detect the level of subcarrier modulation on the signal. Low pass filter 94 removed higher order double frequency terms. In combination, mixer 92 and filter 94 formed a conventional amplitude modulation (AM) demodulator. The output of 94 was thus a voltage which reflected the level of subcarrier modulation on the received optical signal 90. This demodulated signal was the fed to a lock-in-amplifier which was synchronous with an oscillator used to dither the frequency of the subcarrier applied to the source. The a subcarrier frequency was chose such that the round trip phase delay between the two gratings was an odd multiple of π radians, causing the two reflected subcarrier components to combine destructively, nulling the subcarrier modulation on the optical signal 90. However, with a slight adjustment of the subcarrier frequency, the null was no longer attained, and a subcarrier term was detected at 90. For a symmetric dither of the subcarrier about the null point, the lock-in-amplifier detected no component at the dither frequency, whereas for a dither about a subcarrier frequency not aligned with the null point, the lock-in-amplifier detected a signal and provided a feed back, or error signal, to the differential amplifier 98, and onto the subcarrier voltage controlled oscillator 100. This error signal corrected the subcarrier frequency, such that the mean subcarrier frequency was aligned with the null point in the detected subcarrier level at 90. In this way, members 93, 96, 98 acted as a simple servo loop to trim the frequency of oscillator 100, and maintain the null condition at detector 90. A change in length of the fiber between the two gratings, induced by fiber stretcher 78 resulted in the generation of an error signal 97, and thus a shift in the subcarrier frequency which indicated strain in the fiber.

As the twenty meters of fiber between the $FBG_1$ and $FBG_2$ was strained, the elongated path induced an apparent phase shift in the amplitude modulated signal received from $FBG_2$. This induced phase shift forced a frequency shift in the RF drive to maintain a nulled signal at the mixed output of mixer 92. This frequency shift is proportional to the optical path length change and therefore to the integrated strain over the fiber length.

Figure 7:
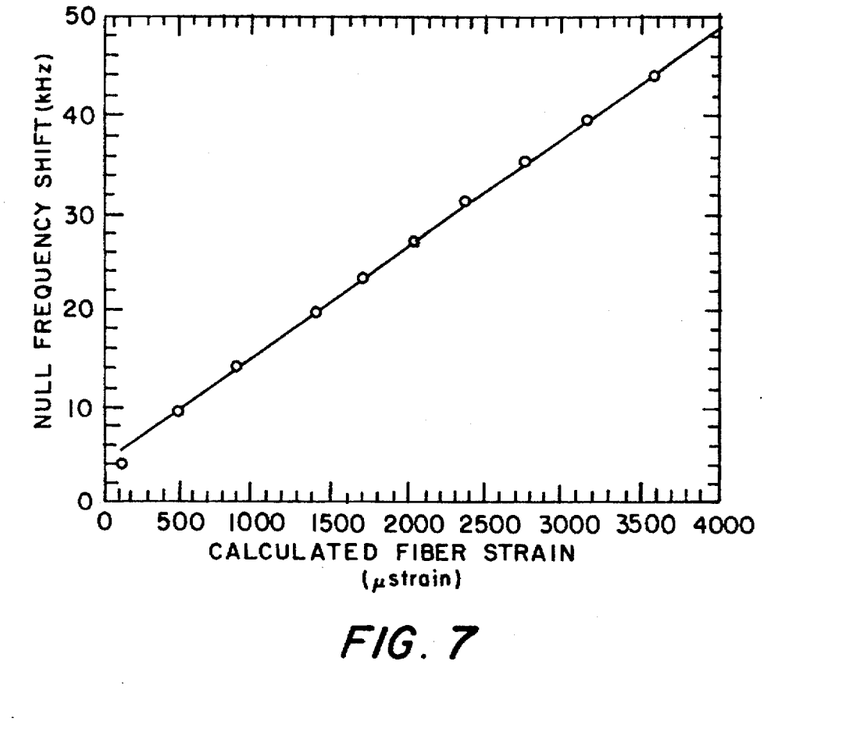
FIG. 7 is a graph illustrating a frequency shift observed with the experimental setup in FIG. 6 for several calculated fiber strains applied between FBG sensors inscribed in a fiber, according to an embodiment of the present invention.

FIG. 7 is a graph illustrating a frequency shift observed with the experimental setup in FIG. 6 for several calculated fiber strains applied between $FBG_1$ and $FBG_2$. As illustrated by FIG. 7, good linearity for fiber strain applied between $FBG_1$ and $FBG_2$ was observed up to 4000 µstrain, and with a strain resolution of approximately 25 µstrain.

Figure 8:
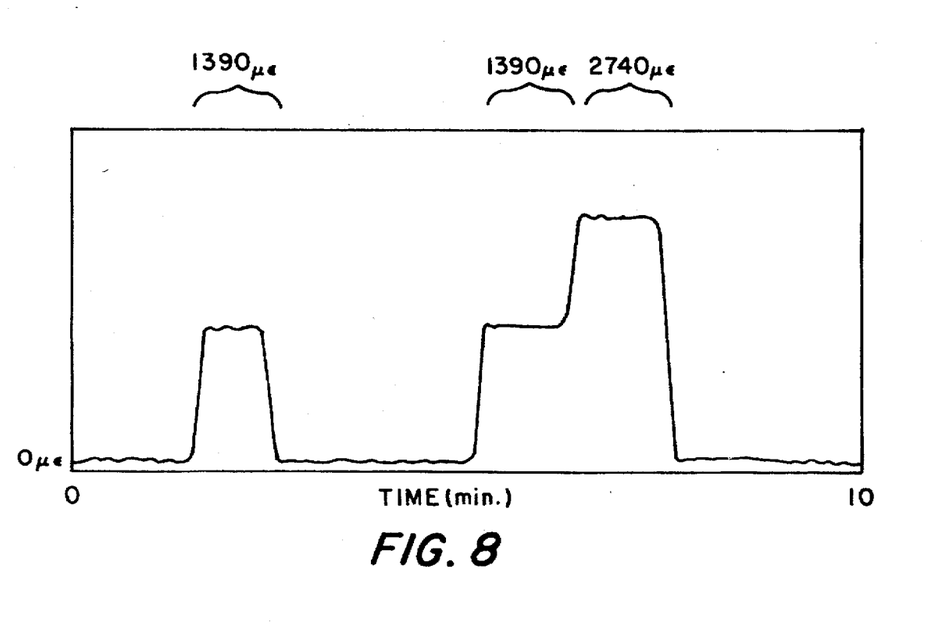
FIG. 8 is a graph illustrating a time response observed with the experimental setup in FIG. 6 as fiber between FBG sensors is strained, according to an embodiment of the present invention.

FIG. 8 is a graph illustrating a time response observed with the experimental setup in FIG. 6 as the twenty meters of fiber between $FBG_1$ and $FBG_2$ was strained. As illustrated by FIG. 8, the output of lock-in amplifier 96 was monitored over ten minutes as strains of 1390 and 2740 µstrain were applied and accurately detected.

According to embodiments of the present invention, wavelength division-based addressing is used to selectively address individual FBG sensors of an FBG sensor array inscribed in a fiber, and an RF subcarrier is used to determine the optical propagation time between two respective FBG sensors of the FBG sensor array. This optical propagation time is then used to calculate the integrated strain over the fiber length between the two respective FBG sensors. This approach can be used in conjunction with the conventional technique of point-by-point strain measurements, where strain on a respective FBG sensor is determined from the wavelength of light reflected by the respective FBG sensor. Thus, a fiber optic sensor system can be used to measure the strain between individual FBG sensors and/or the strain on individual FBG sensors.

According to embodiments of the present invention, an integrated (path averaged) fiber strain can be determined between any of a series of FBG sensors inscribed in a fiber. The technique utilizes RF subcarrier based determination of the optical propagation time between FBG sensors, and wavelength division-based addressing of the individual FBG sensors. This technique could be used in applications where, in addition to addressing point-by-point strain, the averaged strain between FBG sensors is required.

In FIG. 4, strain detection unit 61 comprises tunable laser 42, intensity modulator 44, RF drive 46, coupler 48, detector 50, peak detector 52, wavelength controller 54, phase meter 56, sample-hold device 58 and strain computation unit 60. Thus, in FIG. 4, strain detection unit 61 detects the strain between respective FBG sensors of $FBG_1, \ldots, FBG_N$ inscribed in fiber 22. However, strain detection unit 61 of FIG. 4 is not intended to be limited to comprising tunable laser 42, intensity modulator 44, RF drive 46, coupler 48, detector 50, peak detector 52, wavelength controller 54, phase meter 56, sample-hold device 58 and strain computation unit 60. Instead, a person skilled in the art can design a strain detection unit having different components and various combinations of components. Similarly, FIG. 5 illustrates strain detection unit 71 as comprising broadband source 62, filter 64, RF modulator 63, peak detector 68 and phase meter 70. However, strain detection unit 71 is not intended to be limited to these specific components.

According to embodiments of the present invention, the optical propagation time between FBG sensors is measured by detecting the phase of an RF modulated subcarrier. Many different phase measurement techniques are possible and the present invention is not intended to be limited to the specific phase measurement techniques described herein. For example, phase measurement techniques may include subcarrier/modulated interferometry techniques.

Moreover, although FIG. 4 illustrates an external modulator (that is, intensity modulator 44) modulating the light transmitted into fiber 22, the light transmitted into fiber can be modulated by using direct modulation instead of an intensity modulator.

Although a few preferred embodiments of the present invention have been shown and described, it would be appreciated by those skilled in the art that changes may be made in these embodiments without departing from the principles and spirit of the invention, the scope of which is defined by the claims and their equivalents.

What is claimed is:

1. A sensing apparatus comprising:
    a fiber inscribed with a first fiber Bragg grating sensor and a second fiber Bragg grating sensor; and
    a strain detection unit detecting the strain between the first fiber Bragg grating sensor and the second fiber Bragg grating sensor;
    wherein the strain detection unit detects the strain on the first fiber Bragg grating sensor and the strain on the second fiber Bragg grating sensor in addition to the strain between the first fiber Bragg grating sensor and the second fiber Bragg grating sensor.

2. A sensing apparatus comprising:
    a fiber inscribed with a first fiber Bragg grating sensor and a second fiber Bragg grating sensor; and
    a strain detection unit detecting the strain between the first fiber Bragg grating sensor and the second fiber Bragg grating sensor;
    wherein the first fiber Bragg grating sensor and the second fiber Bragg grating sensor each have a corresponding Bragg wavelength and reflect light which is at approximately the corresponding Bragg wavelength, the strain detection unit adapted for:
    projecting light into the fiber at approximately the Bragg wavelength corresponding to the first fiber Bragg grating sensor, effective to cause the light at approximately the Bragg wavelength of the first fiber Bragg grating sensor to be reflected by the first fiber Bragg grating sensor,
    projecting light into the fiber at approximately the Bragg wavelength corresponding to the second fiber Bragg grating sensor, effective to cause the light at approximately the Bragg wavelength of the second fiber Bragg grating sensor to be reflected by the second fiber Bragg grating sensor, and
    determining the strain between the first fiber Bragg grating sensor and the second fiber Bragg grating sensor based on the optical propagation time of the light projected into the fiber and reflected by the first fiber Bragg grating sensor and the optical propagation time of the light projected into the fiber and reflected by the second fiber Bragg grating sensor.

3. A sensing apparatus as in claim 2, wherein the strain detection unit comprises a light source for projecting light into the fiber, the light source being one of a tunable laser and a broadband light source.

4. A sensing apparatus as in claim 2, wherein the strain detection unit further comprises:
    a modulator modulating the light projected into the fiber at approximately the Bragg wavelength corresponding to the first fiber Bragg grating sensor and the light projected into the fiber at approximately the Bragg wavelength corresponding to the second fiber Bragg grating sensor, with an RF signal;
    a phase detector receiving the RF signal as a reference signal and adapted for
    detecting, with respect to the reference signal, the phase of the RF signal modulated on the light projected into the fiber at approximately the Bragg wavelength corresponding to the first fiber Bragg grating sensor and reflected by the first fiber Bragg grating sensor, and
    detecting, with respect to the reference signal, the phase of the RF signal modulated on the light projected into the fiber at approximately the Bragg wavelength corresponding to the second fiber Bragg grating sensor and reflected by the second fiber Bragg grating sensor; and
    a strain computation unit computing the strain between the first fiber Bragg grating sensor and the second fiber Bragg grating sensor from the detected phase of the RF signal modulated on the light projected into the fiber and reflected by the first fiber Bragg grating sensor and the detected phase of the RF signal modulated on the light projected into the fiber and reflected by the second fiber Bragg grating sensor.

5. A sensing apparatus as in claim 4, wherein the strain detection unit further comprises:
    a tunable laser for projecting light into the fiber and being selectively tunable to respective frequencies; and
    a laser controller detecting the wavelength of the light reflected by the first fiber Bragg grating sensor and using the detected wavelength to selectively tune the tunable laser to the Bragg wavelength of the second fiber Bragg grating sensor.

6. A sensing apparatus as in claim 5, wherein the laser controller comprises:
    a peak detector detecting the intensity of the light reflected by the first fiber Bragg grating sensor; and a wavelength controller tuning the tunable laser in accordance with the intensity of the light reflected by the first fiber Bragg grating sensor and detected by the peak detector.

7. A sensing apparatus comprising:
a fiber inscribed with a first fiber Bragg grating sensor and a second fiber Bragg grating sensor; and
a strain detection unit detecting the strain between the first fiber Bragg grating sensor and the second fiber Bragg grating sensor;
wherein the fiber is inscribed with a plurality of sequentially arranged fiber Bragg grating sensors and the strain detection unit detects the strain between respective adjacent fiber Bragg grating sensors of the plurality of sequentially arranged fiber Bragg grating sensors.

8. A sensing apparatus comprising:
a fiber inscribed with
  a first fiber Bragg grating sensor having a corresponding Bragg wavelength and which is effective to reflect light at approximately the corresponding Bragg wavelength, and
  a second fiber Bragg grating sensor having a corresponding Bragg wavelength and which is effective to reflect light at approximately the corresponding Bragg wavelength;
a light source adapted for
  projecting light into the fiber at approximately the Bragg wavelength corresponding to the first fiber Bragg grating sensor, effective to cause the light at approximately the Bragg wavelength of the first fiber Bragg grating sensor to be reflected by the first fiber Bragg grating sensor, and
  projecting light into the fiber at approximately the Bragg wavelength corresponding to the second fiber Bragg grating sensor, effective to cause the light at approximately the Bragg wavelength of the second fiber Bragg grating sensor to be reflected by the second fiber Bragg grating sensor;
a modulator modulating the light projected into the fiber at approximately the Bragg wavelength corresponding to the first fiber Bragg grating sensor and the light projected into the fiber at approximately the Bragg wavelength corresponding to the second fiber Bragg grating sensor, with an RF signal;
a phase detector receiving the RF signal as a reference signal and adapted for
  detecting, with respect to the reference signal, the phase of the RF signal modulated on the light projected into the fiber at approximately the Bragg wavelength corresponding to the first fiber Bragg grating sensor and reflected by the first fiber Bragg grating sensor, and
  detecting, with respect to the reference signal, the phase of the RF signal modulated on the light projected into the fiber at approximately the Bragg wavelength corresponding to the second fiber Bragg grating sensor and reflected by the second fiber Bragg grating sensor; and
a strain computation unit computing the strain between the first fiber Bragg grating sensor and the second fiber Bragg grating sensor from the detected phase of the RF signal modulated on the light projected into the fiber and reflected by the first fiber Bragg grating sensor and the detected phase of the RF signal modulated on the light projected into the fiber and reflected by the second fiber Bragg grating sensor.

9. A method for sensing strain on a fiber, comprising:
providing a fiber inscribed with a first fiber Bragg grating sensor and a second fiber Bragg grating sensor: and
detecting the strain between the first fiber Bragg grating sensor and the second fiber Bragg grating sensor;
wherein the first fiber Bragg grating sensor and the second fiber Bragg grating sensor each have a corresponding Bragg wavelength and reflect light which is at approximately the corresponding Bragg wavelength, the method further comprising:
  projecting light into the fiber at approximately the Bragg wavelength corresponding to the first fiber Bragg grating sensor, effective to cause the light at approximately the Bragg wavelength of the first fiber Bragg grating sensor to be reflected by the first fiber Bragg grating sensor;
  projecting light into the fiber at approximately the Bragg wavelength corresponding to the second fiber Bragg grating sensor, effective to cause the light at approximately the Bragg wavelength of the second fiber Bragg grating sensor to be reflected by the second fiber Bragg grating sensor; and
  determining the strain between the first fiber Bragg grating sensor and the second fiber Bragg grating sensor based on the optical propagation time of the light projected into the fiber and reflected by the first fiber Bragg grating sensor and the optical propagation time of the light projected into the fiber and reflected by the second fiber Bragg grating sensor.

10. A method as in claim 9, further comprising:
modulating the light projected into the fiber at approximately the Bragg wavelength corresponding to the first fiber Bragg grating sensor and the light projected into the fiber at approximately the Bragg wavelength corresponding to the second fiber Bragg grating sensor, with an RF signal;
detecting, with respect to the RF signal as a reference signal, the phase of the RF signal modulated on the light projected into the fiber at approximately the Bragg wavelength corresponding to the first fiber Bragg grating sensor and reflected by the first fiber Bragg grating sensor;
detecting, with respect to the RF signal as a reference signal, the phase of the RF signal modulated on the light projected into the fiber at approximately the Bragg wavelength corresponding to the second fiber Bragg grating sensor and reflected by the second fiber Bragg grating sensor; and
computing the strain between the first fiber Bragg grating sensor and the second fiber Bragg grating sensor from the detected phase of the RF signal modulated on the light projected into the fiber and reflected by the first fiber Bragg grating sensor and the detected phase of the RF signal modulated on the light projected into the fiber and reflected by the second fiber Bragg grating sensor.

11. A method as in claim 10, wherein a light source is selectively tunable to project light into the fiber at different frequencies, the method further comprising:
detecting the wavelength of the light reflected by the first fiber Bragg grating sensor; and
using the detected wavelength to selectively tune the light source to the Bragg wavelength of the second fiber Bragg grating sensor.

12. A method as in claim 10, further comprising:
detecting the intensity of the light reflected by the first fiber Bragg grating sensor; and
tuning the light source in accordance with the detected intensity.

\* \* \* \* \*